United States Patent
Asfia et al.

(10) Patent No.: US 6,526,775 B1
(45) Date of Patent: Mar. 4, 2003

(54) ELECTRIC AIR CONDITIONING SYSTEM FOR AN AIRCRAFT

(75) Inventors: Julie F. Asfia, Huntington Beach, CA (US); Kenneth R. Williams, Huntington Beach, CA (US); Warren A. Atkey, Bothell, WA (US); Charles J. Fiterman, Mukilteo, WA (US); Steven M. Loukusa, Bothell, WA (US); Casey Y. Ng, Sammamish, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/952,820

(22) Filed: Sep. 14, 2001

(51) Int. Cl.$^7$ ................................................ F25D 9/00
(52) U.S. Cl. .......................................... 62/402; 62/401
(58) Field of Search ............................. 62/86, 87, 401, 62/402

(56) References Cited

U.S. PATENT DOCUMENTS

| | | | |
|---|---|---|---|
| 3,657,898 A | * 4/1972 | Ness et al. ................... 62/402 |
| 4,091,613 A | 5/1978 | Young | |
| 4,261,416 A | 4/1981 | Hamamoto | |
| 4,295,518 A | * 10/1981 | Rannenberg ............... 165/48.2 |
| 4,434,624 A | 3/1984 | Cronin et al. | |
| 4,494,372 A | 1/1985 | Cronin | |
| 4,503,666 A | 3/1985 | Christoff | |
| 4,514,976 A | 5/1985 | Christoff | |
| 4,523,517 A | * 6/1985 | Cronin ......................... 237/2 A |
| 4,550,573 A | * 11/1985 | Rannenberg ................ 62/172 |
| 5,086,622 A | * 2/1992 | Warner ......................... 62/172 |
| 5,121,610 A | * 6/1992 | Atkinson et al. ............. 62/151 |
| 5,442,905 A | 8/1995 | Claeys et al. | |
| 5,461,882 A | * 10/1995 | Zywiak ......................... 62/401 |
| 5,535,601 A | * 7/1996 | Teraoka ........................ 62/402 |
| 5,709,103 A | * 1/1998 | Williams ................... 244/118.5 |
| 5,813,630 A | * 9/1998 | Williams ................... 244/118.5 |
| 5,899,085 A | * 5/1999 | Williams ....................... 62/236 |
| 5,956,960 A | * 9/1999 | Niggeman ..................... 60/785 |
| 5,967,461 A | * 10/1999 | Farrington ................. 244/118.5 |
| 6,041,615 A | * 3/2000 | Ostersetzer et al. .......... 62/402 |
| 6,058,715 A | * 5/2000 | Strang et al. .................. 62/172 |
| 6,070,418 A | * 6/2000 | Crabtree et al. ............... 62/172 |
| 6,128,909 A | * 10/2000 | Jonqueres ..................... 62/402 |
| 6,427,471 B1 | * 8/2002 | Ando et al. .................... 62/402 |

* cited by examiner

Primary Examiner—William C. Doerrler
(74) Attorney, Agent, or Firm—Harness, Dickey & Pierce P.L.C.

(57) ABSTRACT

An all electric air conditioning system for an aircraft, wherein the aircraft defines an interior volume having conditioned air at a first pressure. A compressor is provided and is operable to compress supply air to a second pressure. The compressor being operated in response to an electrical drive motor. A passage fluidly couples the compressor and the interior volume of the aircraft. A heat dissipating device, such as a heat exchanger, is positioned in the passage to extract heat energy from the supply air. This arrangement permits conditioning of air within the aircraft without using bleed air from the engines. The use of bleed air results in a significant amount of fuel burn. An optional conditioned air recovery system may be coupled to the interior volume of the fuselage to direct at least a portion of the conditioned air from the interior volume back for further conditioning and use.

29 Claims, 7 Drawing Sheets

ELECTRIC AIR CONDITIONING SYSTEM FOR AN AIRCRAFT

FIELD OF THE INVENTION

The present invention generally relates to air conditioning systems and, more particularly, to an electrically driven air conditioning system for an aircraft that does not rely on engine bleed air.

BACKGROUND OF THE INVENTION

Many air conditioning systems employed in modern commercial aircraft utilize the air-to-air thermodynamic cycle to provide cooling and/or heating air to the various compartments on the aircraft, such as the passenger cabin, cargo holds, and the like. Air from the compressor stages of the main jet propulsion engines, also known as "bleed air," is generally output at high temperature and pressure (i.e. 610° F. and 60 psi). Conventionally, this bleed air is then conditioned through conditioning packs before passing into the pressurized fuselage for cabin temperature control, ventilation, and pressurization. This conditioned air within the fuselage is then discharged to the outside ambient air through various overboard valves, overflow valves, and cabin leaks.

This known method of conditioning air for use with the various aircraft systems is inefficient. That is, during a typical steady state cruise operation, more energy than is necessary for the primary requirements of the conditioning system (e.g. cabin temperature control, ventilation, and pressurization) is added into the conditioning system at the engines in the form of additional fuel. Much of this excess energy is wasted in the form of heat and pressure drop through ductwork, valves, and various other components of the conditioning system. Moreover, extracting work from the engines in the form of bleed air is inefficient relative to other extraction methods. Consequently, the use of bleed air from the engines reduces the efficiency of the engines and, thus, increases the fuel consumption and load on the engines. By eliminating or at least minimizing the use of bleed air in the various aircraft systems, it is believed that more efficient jet engines may be developed. Moreover, it is believed that alternative air conditioning systems may lead to a reduction in aircraft weight, assembly complexity, and fuel consumption.

Accordingly, there exists a need in the relevant art to provide an air conditioning system for an aircraft that does not rely on jet engine bleed air for operation. Furthermore, there exists a need in the relevant art to provide an air conditioning system for an aircraft that is capable of reducing the aircraft weight, assembly complexity, and fuel consumption. Still further, there exists a need in the relevant art to provide an air conditioning system for an aircraft driven by electrical energy. Moreover, there exists a need in the relevant art to provide an air conditioning system for an aircraft that overcomes the disadvantages of the prior art.

SUMMARY OF THE INVENTION

An all electric air conditioning system for an aircraft, wherein the aircraft defines an interior volume having conditioned air at a first pressure, is provided having an advantageous construction. A compressor is provided and is operable to compress supply air to a second pressure. The compressor being operated in response to an electrical drive motor. A passage fluidly couples the compressor and the interior volume of the aircraft. A heat-dissipating device, such as a heat exchanger, is positioned in the passage to extract heat energy from the supply air. This arrangement permits conditioning of air within the aircraft without using bleed air from the engines. The use of bleed air results in a significant amount of fuel burn. An optional conditioned air recovery system may be coupled to the interior volume of the fuselage to direct at least a portion of the conditioned air from the interior volume back for further conditioning and use.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. That is, the electrical air conditioning system of the present invention may find utility in other applications, which commonly use bleed air to drive an air conditioning system, such as in tanks and the like.

Figure 1:
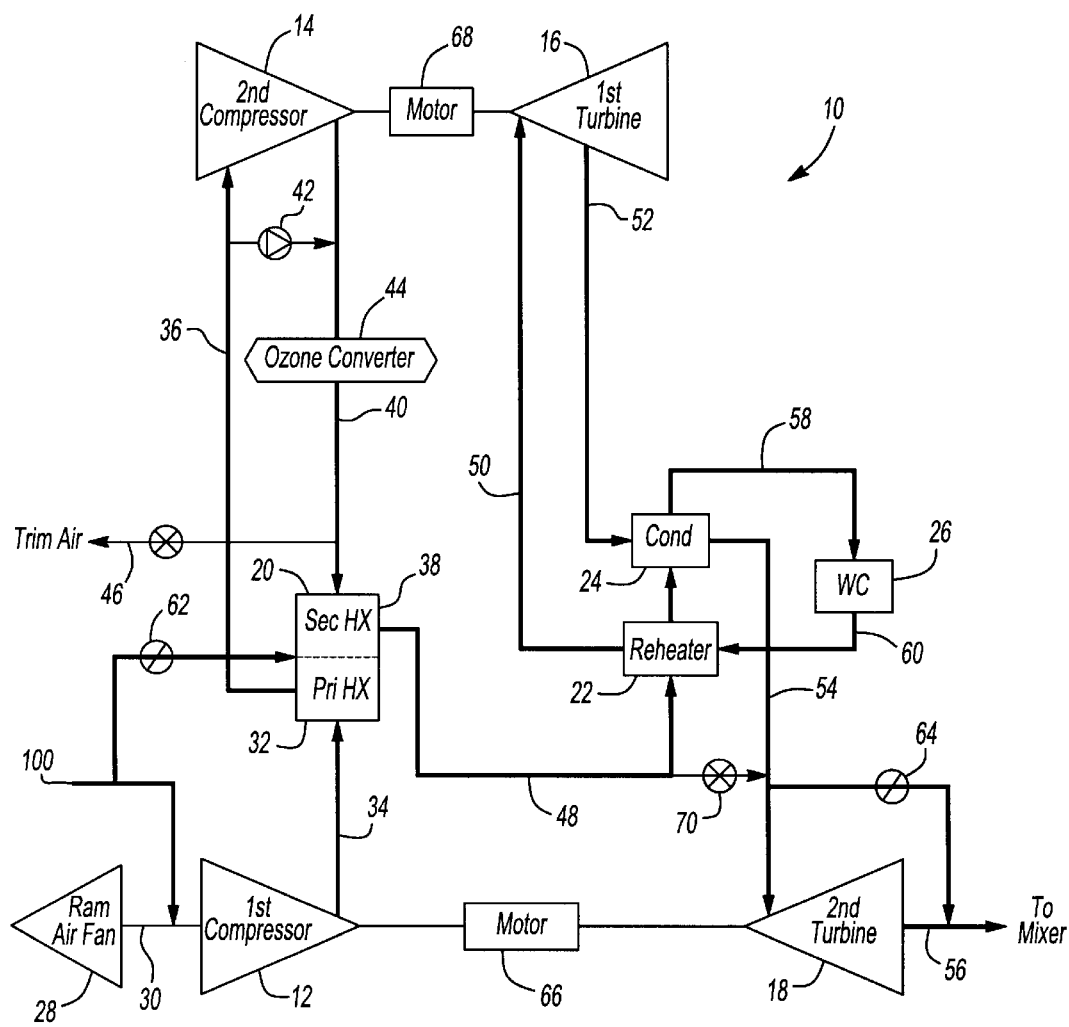
FIG. 1 is a circuit diagram illustrating a first embodiment of the present invention in a ground or low altitude operation configuration.
Figure 2:
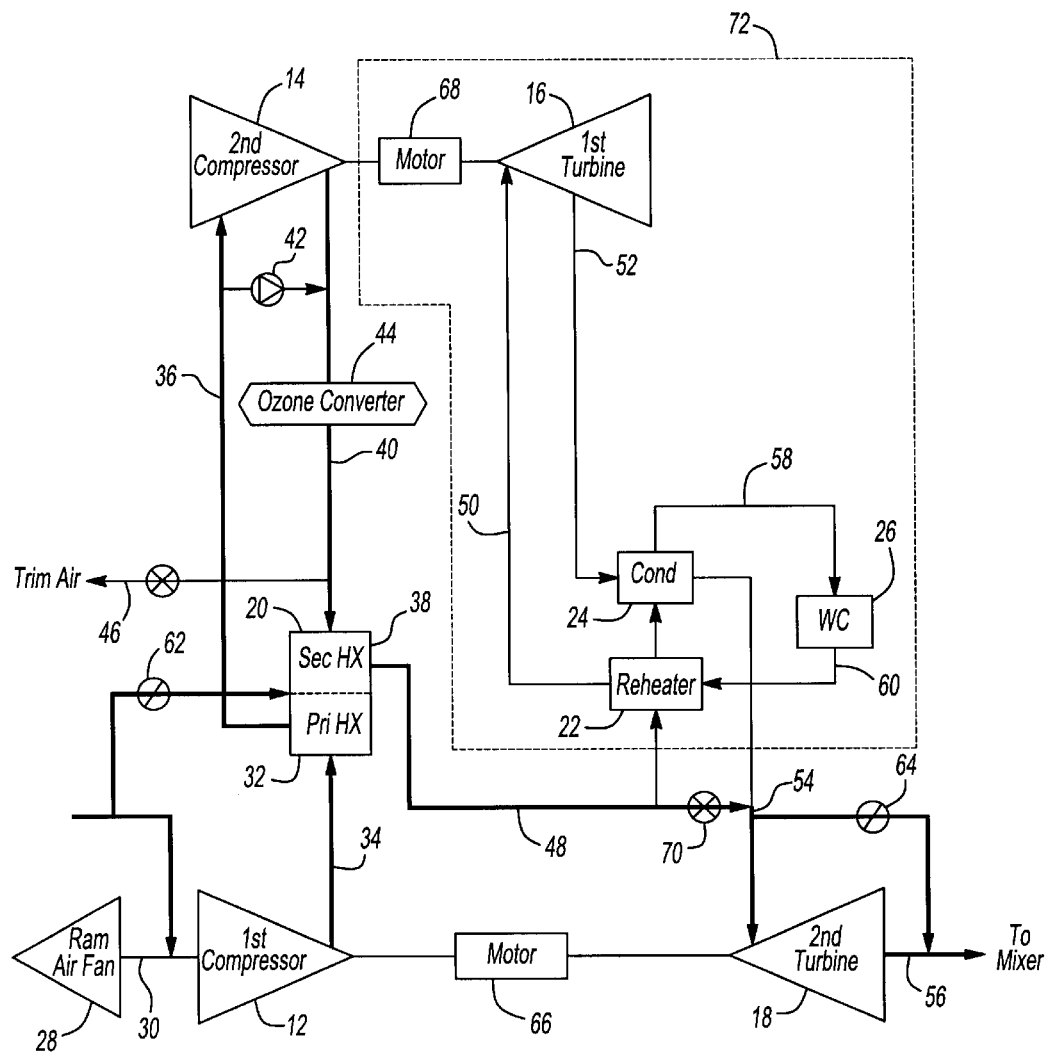
FIG. 2 is a circuit diagram illustrating the first embodiment of the present invention in a cruise operation configuration.

According to a first embodiment of the present invention, an air conditioning system 10 is illustrated that is capable of eliminating the use of bleed air. Air conditioning system 10 comprises a first compressor 12, a second compressor 14, a first turbine 16, a second turbine 18, a heat exchanger assembly 20, a reheater 22, a condenser 24, and a high-pressure water separator 26. With particular reference to FIG. 1, a ram air fan 28 provides cold side air for heat exchanger assembly 20 during ground operation. With particular reference to FIG. 2, a ram air inlet scoop (not shown) provides cold side air for heat exchanger assembly 20 during in-flight operation. Ram air, generally indicated as 100, is provided to first compressor 12 via a passage 30, and further to heat exchanger assembly 20. A valve 62 controls the amount of ram air 100 that is directed to heat exchanger assembly 20. Alternatively, engine fan air could be used to provide cool side air to first compressor 12 in place of ram air 100.

First compressor 12 is fluidly coupled to a primary heat exchanger 32 of heat exchanger assembly 20 via a passage 34. Primary heat exchanger 32 in turn is fluidly coupled to second compressor 14 via a passage 36. Second compressor 14 in turn is fluidly coupled to a secondary heat exchanger 38 via a passage 40. Secondary heat exchanger 38 is fluidly separate from primary heat exchanger 32. Hence, it should be understood that primary heat exchanger 32 and secondary heat exchanger 38 might be configured as separate units or a single unit having multiple discrete chambers.

A compressor bypass valve 42 may fluidly interconnect passage 36 and passage 40 so as to permit bypassing of second compressor 14. Furthermore, an ozone converter 44 may be positioned in series within passage 40 to permit proper conversion of ambient air during a cruise phase of flight.

As seen in FIGS. 1 and 2, heat exchanger assembly 20 also employs ram air 100 acting as a heat sink to remove excess heat from the air upon exit from first compressor 12 and again upon exit from second compressor 14. Trim air 46 may be extracted from passage 40 for use in individual compartment temperature control or for use in other aircraft systems.

Secondary heat exchanger 38 is fluidly coupled to reheater 22 via a passage 48. The cold outlet of reheater 22 is directed to first turbine 16 through a passage 50 so as to be expanded and reduced in temperature therein. This air is then directed into the cold inlet of condenser 24 via a passage 52. It should be appreciated that the cold inlet side of condenser 24 is maintained above freezing to prevent ice formation. The air from condenser 24 is then directed to second turbine 18 via a passage 54 for final expansion. Finally, air exits second turbine 18 via passage 56 and is directed to a mix manifold (not shown) for distribution into the aircraft cabin.

Still referring to FIGS. 1 and 2, air conditioning system 10 further includes a passage 58 fluidly interconnecting condenser 24 to water collector 26 and a passage 60 fluidly interconnecting water collector 26 to reheater 22. A passage 61 is further provided that fluidly interconnects reheater 22 and condenser 24. Air conditioning system 10 still further includes a ram air modulator valve/actuator 62 used for controlling the flow of ram air 100. A turbine bypass valve 64 fluidly interconnects passage 54 and passage 56 so as to permit bypassing of second turbine 18. A first motor 66 is operably coupled between first compressor 12 and second turbine 18 and a second motor 68 is operably coupled between second compressor 14 and first turbine 16.

With particular reference to FIG. 2, it can be seen that air conditioning system 10 further includes an altitude valve 70 fluidly interconnecting passage 48 and passage 54. Altitude valve 70 permits bypassing of a condensing loop 72 above a predetermined altitude. Condensing loop 72 generally includes reheater 22, passage 50, first turbine 16, passage 52, condenser 24, passage 58, water collector 26, passage 60, and passage 61. The opening of altitude valve 70 bypasses condensing loop 72 such that primary cooling of the air occurs in heat exchanger assembly 20 and second turbine 18. This arrangement at altitude enables the overall pressure drop in the system to be minimized so as to provide sufficient flow to the passenger cabin at lower power consumption levels.

Referring to FIGS. 1 and 2, during operation, first compressor 12 receives ambient air 100 from ram air fan 28. This air is compressed within first compressor 12 and is passed through primary heat exchanger 32 of heat exchanger assembly 20 to second compressor 14. Primary heat exchanger 32 removes heat from the air using ram air 100 as a heat sink. The air is then compressed within second compressor 14 and passed through secondary heat exchanger 38 of heat exchanger assembly 20. Second compressor 14 may be bypassed using compressor bypass valve 42.

During ground or low altitude operation, air then exits secondary heat exchanger 38 and is directed to reheater 22. The cold outlet of reheater 22 directs air to first turbine 16 where the temperature and pressure are reduced. The air is then directed to condenser 24 to remove excess water from the air. The cold outlet of condenser 24 directs the air to second turbine 18 where the temperature and pressure are further reduced. Lastly, the air is then directed to the mixing manifold and distributed to the aircraft cabin.

Air and water from condenser 24 flows to water collector 26 through passage 58, where water is collected by water collector 26.

During high altitude operation, air from secondary heat exchanger 38 of heat exchanger assembly 20 is directed through altitude valve 70 so as to completely bypass condensing loop 72. Accordingly, air flows from secondary heat exchanger 38 directly to second turbine 18 so as to minimize the pressure drop within system 10 during high altitude cruise. Therefore, power consumption is minimized.

According to a second embodiment of the present invention, an air conditioning system 10' is illustrated that is capable of eliminating the use of bleed air and further capable of utilizing the potential energy of pressurized air leaving the aircraft cabin during high altitude flight.

Figure 3:
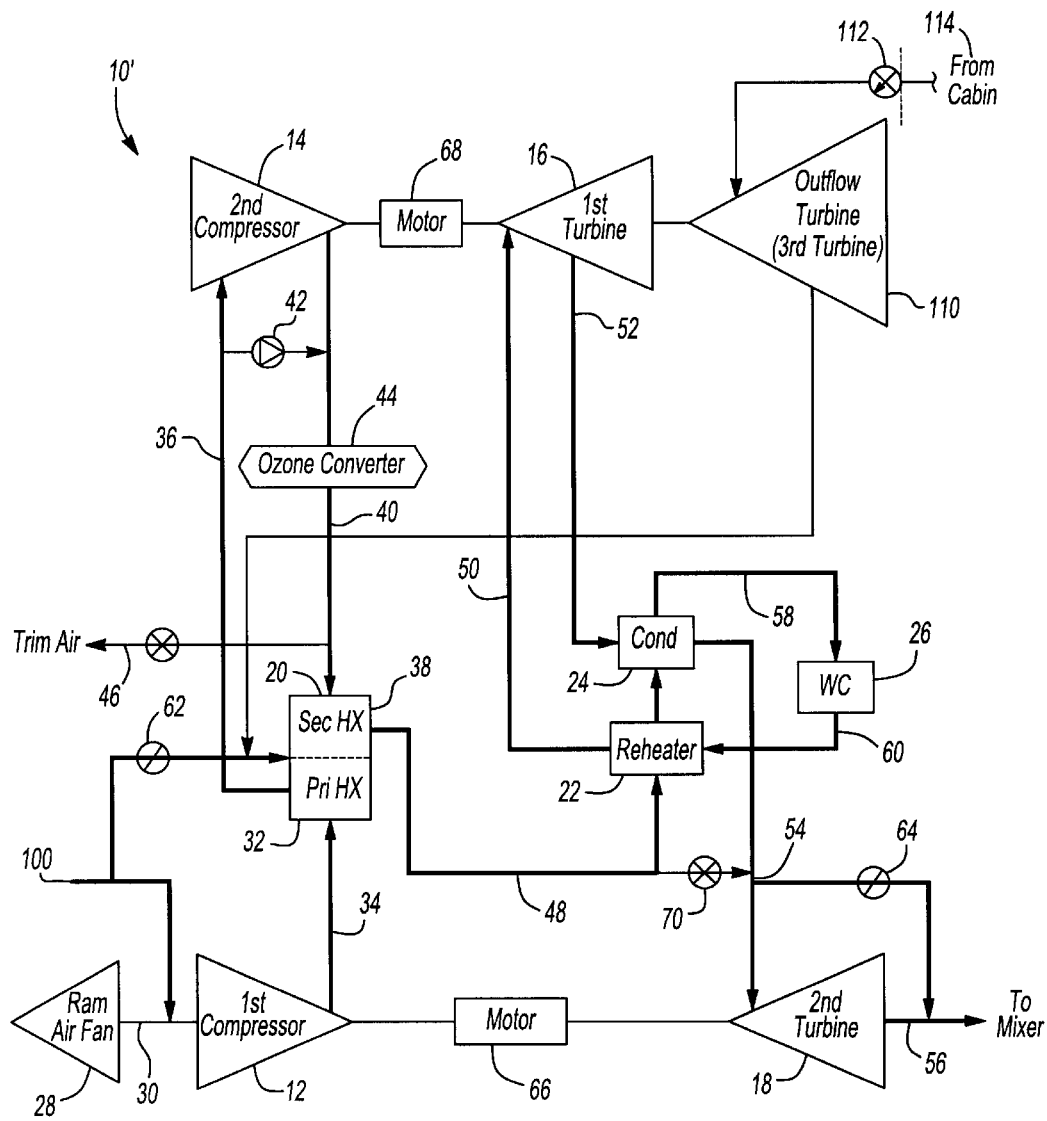
FIG. 3 is a circuit diagram illustrating a second embodiment of the present invention in a ground or low altitude operation configuration.
Figure 4:
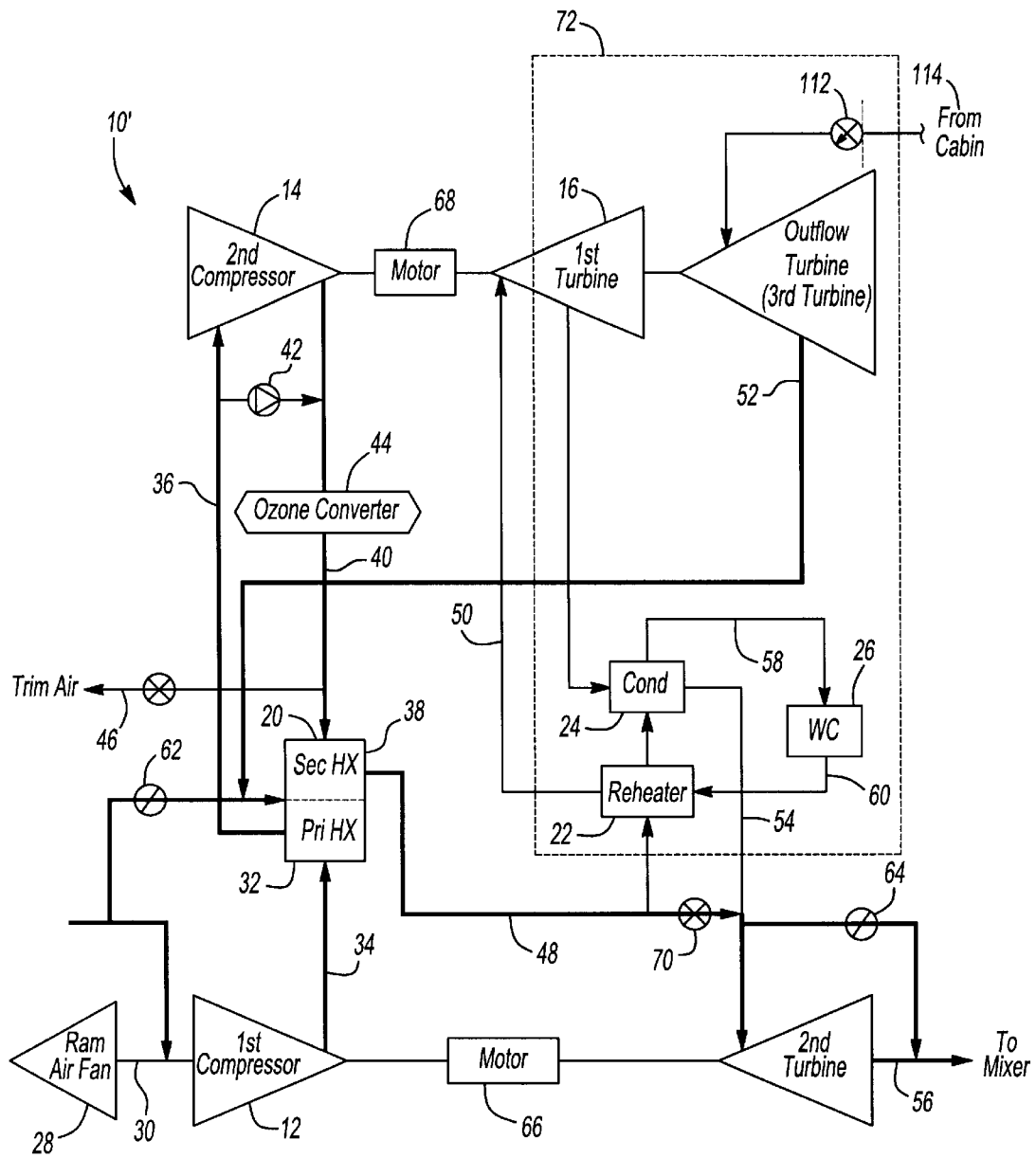
FIG. 4 is a circuit diagram illustrating the second embodiment of the present invention in a cruise operation configuration.

With particular reference to FIGS. 3 and 4, in addition to those elements described in reference to FIGS. 1 and 2, air conditioning system 10' further includes an outflow turbine 110. Outflow turbine 110 is illustrated as being operably coupled to motor 68 and first turbine 16. However, it must be understood that outflow turbine 110 may be alternatively coupled to first compressor 12 or second turbine 18. Outflow turbine 110 receives previously conditioned air from the cabin of the aircraft through a cabin recovery valve 112. Cabin recovery valve 112 is actuated to provide flow of conditioned air through outflow turbine 110. It should be understood that cabin recovery valve 112 or outflow turbine 110 might include an integral anti-depressurization valve to guard against inadvertent depressurization of the aircraft cabin. That is, should a duct burst or other failure to occur, anti-depressurization valve will close to prevent further depressurization of the aircraft cabin. The anti-depressurization valve may be a conventional aerodynamic valve that closes upon sensing too much air flow.

Cabin air 114 is directed through outflow turbine 110 where it is quickly expanded. This expansion of cabin air 114 causes a rapid temperature drop of cabin air 114, which is directed through passage 116 to heat exchanger assembly 20. This cooled air serves to supplement ram air 100, thereby reducing the drag associated with the ram air system by not requiring as much outside ambient air for heat exchanger assembly 20 cooling. Moreover, the power generated by outflow turbine 110 serves to reduce the work required by motor 68 when driving second compressor 14. A significant electrical power and ram air drag saving is achieved as the cruise phase is the majority of the entire flight.

Still referring to FIGS. 3 and 4, during ground or low altitude operation, air conditioning system 10' works identically to air conditioning system 10. However, during high altitude operation, as described above, cabin air 114 is expanded and cooled in outflow turbine 110 and is passed to heat exchanger assembly 20 for cooling. Like air conditioning system 10, condensing loop 72 is bypassed using altitude valve 70. The opening of altitude valve 70 bypasses condensing loop 72 such that primary cooling of the air occurs in heat exchanger assembly 20, supplementing with expanded cabin air 114, and second turbine 18. This arrangement, at altitude, enables the overall pressure drop in system 10' to be minimized so as to provide sufficient flow to the passenger cabin at lower power consumption levels.

According to a third embodiment of the present invention, an air conditioning system 10" is illustrated that is capable of eliminating the use of bleed air and further cap able of utilizing the potential energy of pressurized air leaving the aircraft cabin during high altitude flight. However, unlike the second embodiment of the present invention, air conditioning system 10" employs a series of control valves such that first turbine 16 acts similar to outflow turbine 110 of the second embodiment.

Figure 5:
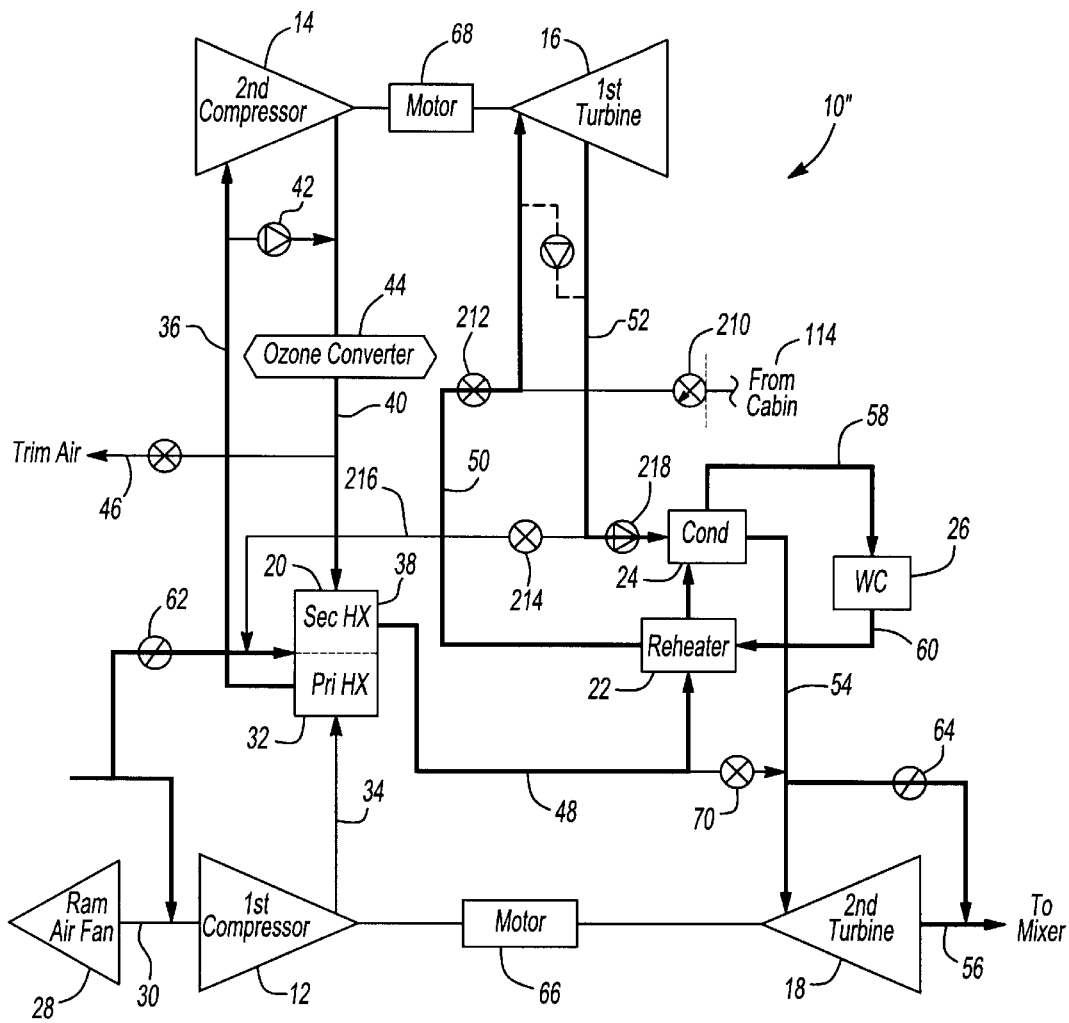
FIG. 5 is a circuit diagram illustrating a third embodiment of the present invention in a ground or low altitude operation configuration.
Figure 6:
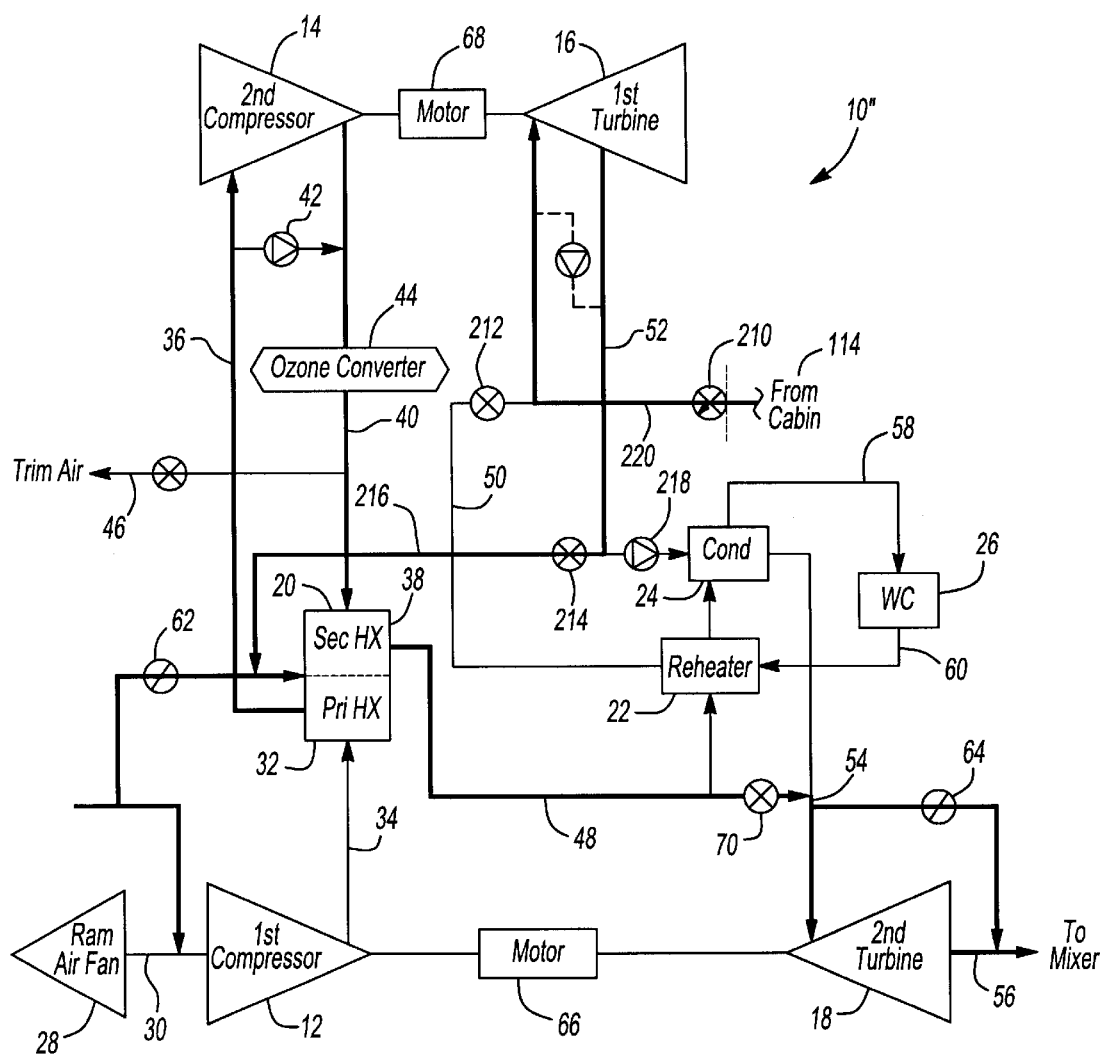
FIG. 6 is a circuit diagram illustrating the third embodiment of the present invention in a cruise operation configuration.

More particularly, as best seen in FIGS. 5 and 6, in addition to those elements described in reference to FIGS. 1 and 2, air conditioning system 10" further includes a first cabin recovery valve 210. First turbine 16 receives previously conditioned air 114 from the cabin of the aircraft through first cabin recovery valve 210. First cabin recovery valve 210 is variably actuated to control the preferred flow of conditioned air 114 into passage 50. Conditioned air 114 joins air flow within passage 50 and is directed to first turbine 16 where it is expanded and cooled. It should be understood that first cabin recovery valve 210 or first turbine 16 may include an integral anti-depressurization valve to guard against inadvertent depressurization of the aircraft cabin. That is, should a duct burst or other failure to occur, anti-depressurization valve will close to prevent further depressurization of the aircraft cabin. The anti-depressurization valve may be a conventional aerodynamic valve that closes upon sensing too much air flow.

Air conditioning system 10" further includes a second cabin recovery valve 212 disposed within passage 50 upstream from the inflow of cabin air 114. Second cabin recovery valve 212 is selectively actuated to prohibit air flow from reheater 22 to first turbine 16 and backflow of cabin air 114 to reheater 22. A third cabin recovery valve 214 is disposed within a passage 216 interconnecting passage 52 and heat exchanger assembly 20. A check valve 218 is further disposed in passage 52 downstream from the interconnection with passage 216. Check valve 218 prevents backflow of air from condenser 24 in the event of a failure of third cabin recovery valve 214.

Still referring to FIGS. 5 and 6, during ground or low altitude operation, air conditioning system 10" works identically to air conditioning system 10. However, during high altitude operation, cabin air 114 is expanded and cooled in first turbine 16 and is passed to heat exchanger assembly 20 for cooling. Like air conditioning system 10, condensing loop 72 is bypassed using altitude valve 70 and the bypass valves are actuated to direct cabin air 114 to first turbine 16 and heat exchanger assembly 20. Specifically, first cabin recovery valve 210 is opened to allow flow of cabin air 114 into a passage 220. Cabin air 114 is then directed to first turbine 16 via passage 50 by closing second cabin recovery valve 212. Cabin air 114 is then expanded and cooled and used to supplement ram air 100 in heat exchanger assembly 20. Check valve 218 prevents flow through a failed-open valve 214 to the ram system. The opening of altitude valve 70 bypasses condensing loop 72 such that primary cooling of the air occurs in heat exchanger assembly 20, supplementing with expanded cabin air 114, and second turbine 18. This arrangement, at altitude, enables the overall pressure drop in system 10" to be minimized so as to provide sufficient flow to the passenger cabin at lower power consumption levels.

In addition to the above embodiments described in detail, there are numerous modifications that are anticipated to further tailor the air conditioning system of the present invention. However, it must be understood that each of the following modifications, although described together, is individually applicable to the above described embodiments. That is, each modification may be employed separately from the remaining modifications, if desired. They are simply being described together here in the interest of brevity.

Figure 7:
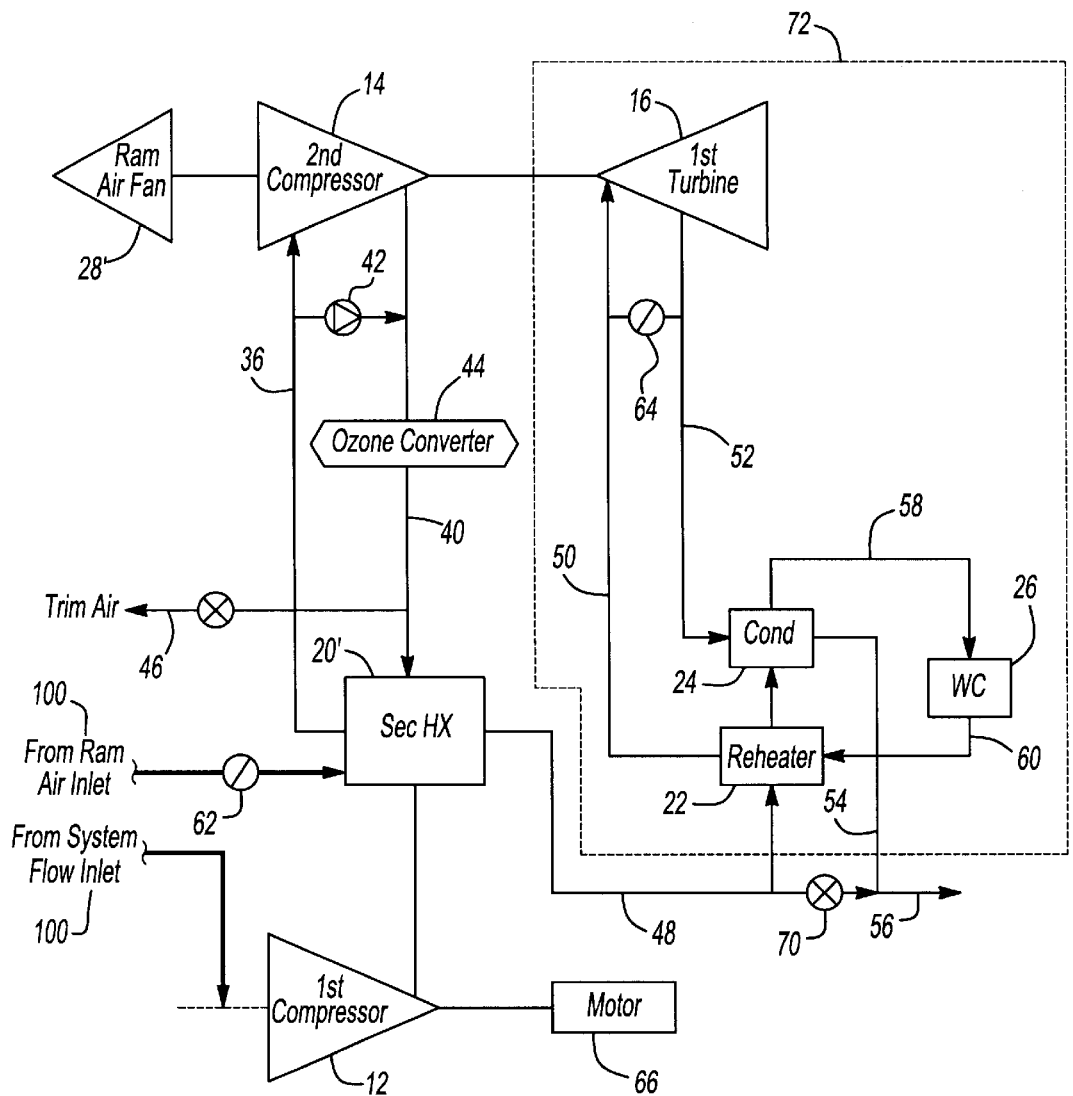
FIG. 7 is a circuit diagram illustrating various alternative modifications of the present invention.

Referring to FIG. 7, it should be understood that ram air fan 28 may alternatively be coupled to second compressor 14, generally indicated at 28'. Ram air fan 28' would thus supply ram air to second compressor 14. Still referring to FIG. 7, primary heat exchanger 32 may be eliminated if it is determined that a two-stage heat exchanger system is not required, thereby generally designated as 20'. Similarly, motor 68 may be eliminated if added mechanical input is not required between second compressor 14 and first turbine 16. Likewise, second turbine 18 may be eliminated if the necessary temperature and pressure are achieved depending on the equipment used and the aircraft requirements. However, it is preferable that if second turbine 18 is eliminated, then turbine bypass valve 64 be similarly eliminated since its use is now defeated. Alternatively, turbine bypass valve 64 may be repositioned between passage 50 and passage 52, thereby serving to selectively bypass first turbine 16.

Existing aircraft require the use of bleed air to operate the aircraft air conditioning system. However, bleed air requires a significant amount of fuel burn where a significant amount of energy is wasted by the processing of the bleed air. Hence, there is a need in modern designs to alleviate the use of bleed air in air conditioning systems. According to the principles of the present invention, an all electrical air conditioning system is provided that eliminates the need for bleed air. Moreover, the present invention enables much of the energy of the conditioned air within the cabin to be recovered, thereby reducing electrical power consumption. The elimination of the use of bleed air enables aircraft engines to be more efficiency designed, thereby reducing the use of fuel. It should be appreciated that extracting electricity from jet engines is much more efficient than extracting bleed air. Still further, the present invention provides a method of reducing the weight and maintenance requirements of the aircraft since engine pneumatic ducting, APU ducting, and pneumatic components are eliminated. Duct leaks, may be eliminated or at least reduce while overheat detection systems may no longer be necessary. Additionally, air conditioning systems may be modularized, since they no longer need to be sized relative to APU/Engine pneumatic operation performance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aircraft comprising:
   a fuselage defining an interior volume, said interior volume having cabin air at a first pressure;
   a first compressor operable to compress supply air to a second pressure;
   a first electrical motor driving said first compressor;
   a passage fluidly coupling said first compressor and said interior volume; and
   a heat dissipating device positioned in said passage, said heat dissipating device operable to extract heat energy from said supply air;
   a second compressor fluidly coupled to said first compressor, said second compressor being operable to compress said supply air from said first compressor; and
   a second electrical motor driving said second compressor.

2. The aircraft according to claim 1, further comprising:
   a vapor system coupled downstream of said first compressor, said vapor system being operable to remove water vapor from said supply air.

3. The aircraft according to claim 2 wherein said vapor system comprises:
   a reheater fluidly coupled to said heat dissipating device;
   a condenser fluidly coupled to said reheater; and
   a water collector fluidly coupled to said condenser.

4. The aircraft according to claim 2, further comprising:
   a vapor system bypass valve positioned such that said vapor system bypass valve is operable to selectively bypass said vapor system during low vapor operation.

5. The aircraft according to claim 1, further comprising:
   a first turbine operably coupled to one of said first compressor and said second compressor.

6. The aircraft according to claim 1, further comprising:
   a first turbine operably coupled to first compressor; and
   a second turbine operably coupled to said second compressor.

7. The aircraft according to claim 1, further comprising:
   a cabin air recovery system operably coupled to said first compressor, said cabin air recovery system being operable to direct said cabin air to one of said first compressor and said heat dissipating device.

8. The aircraft according to claim 7 wherein said cabin air recovery system comprises:
   a recovery turbine operably coupled to said first compressor, said recovery turbine being operable to direct said cabin air to one of said first compressor and said heat dissipating device.

9. The aircraft according to claim 1 wherein said first pressure and said second pressure are equal.

10. The aircraft according to claim 1 wherein said supply air is ambient air outside of said fuselage.

11. The aircraft according to claim 1 wherein said supply air includes at least a portion of said cabin air.

12. The aircraft according to claim 1 wherein said heat dissipating device is a heat exchanger assembly, said heat exchanger assembly including an inlet passage directing said supply air for use as a heat sink.

13. The aircraft according to claim 1, further comprising:
   a ram air fan rotatably coupled to said first compressor, said ram air fan operable to supply a ram air to at least one of said first compressor and heat dissipating device.

14. An aircraft comprising:
   a fuselage defining an interior volume;
   an air conditioning system coupled to said fuselage, said air conditioning system being operable to output conditioned air to said interior volume; and
   a cabin air recovery system coupled to said air conditioning system, said cabin air recovery system being operable to direct at least a portion of said conditioned air from said interior volume back to said air conditioning system for further conditioning;
   a second compressor fluidly coupled to said first compressor, said second compressor being operable to compress said conditioned air from said first compressor; and
   a second electrical motor driving said second compressor.

15. The aircraft according to claim 14, wherein said air conditioning system comprises:
   a first compressor outputting compressed air;
   a first electrical motor driving said first compressor;
   a passage fluidly coupling said first compressor and said interior volume; and
   a heat dissipating device positioned in said passage, said heat dissipating device operable to extract heat energy from said conditioned air.

16. The aircraft according to claim 15, further comprising:
   a vapor system coupled downstream of said first compressor, said vapor system being operable to remove water vapor from said conditioned air.

17. The aircraft according to claim 16 wherein said vapor system comprises:
   a reheater fluidly coupled to said heat dissipating device;
   a condenser fluidly coupled to said reheater; and
   a water collector fluidly coupled to said condenser.

18. The aircraft according to claim 17, further comprising:
   a first turbine operably coupled to said first compressor, said first turbine being fluidly positioned between said reheater and said condenser.

19. The aircraft according to claim 18, further comprising:
   a bypass valve positioned between said reheater and said condenser, said bypass valve being operable to fluidly bypass said first turbine.

20. The aircraft according to claim 16, further comprising:
   a vapor system bypass valve positioned such that said vapor system bypass valve is operable to selectively bypass said vapor system during low vapor operation.

21. The aircraft according to claim 14, further comprising:
   a first turbine operably coupled to one of said first compressor and said second compressor.

22. The aircraft according to claim 14, further comprising:
   a first turbine operably coupled to first compressor; and
   a second turbine operably coupled to said second compressor.

23. The aircraft according to claim 15 wherein said cabin air recovery system comprises:
   a recovery; turbine operably coupled to said first compressor, said recovery turbine being operable to direct said conditioned air to one of said first compressor and said heat dissipating device.

24. An aircraft comprising:
   a fuselage defining an interior volume, said interior volume having conditioned air at a first pressure;
   a first compressor operable to compress supply air to a second pressure;
   a first electrical motor driving said first compressor;
   a passage fluidly coupling said first compressor and said interior volume;

a heat dissipating device positioned in said passage, said heat dissipating device operable to extract heat energy from said supply air; and a conditioned air recovery system coupled to at least one of said first compressor and said heat dissipating device, said conditioned air recovery system being operable to direct at least a portion of said conditioned air from said interior volume to be mixed with said supply air;

a second compressor fluidly coupled to said first compressor, said second compressor being operable to compress said supply air from said first compressor;

a first turbine operably coupled to one of said first compressor and said second compressor; and a second electrical motor driving said second compressor.

25. The aircraft according to claim 24, further comprising:

a vapor system coupled downstream of said first compressor, said vapor system being operable to remove water vapor from said supply air, said vapor system having a reheater fluidly coupled to said heat dissipating device, a condenser fluidly coupled to said reheater, and a water collector fluidly coupled to said condenser.

26. The aircraft according to claim 25, further comprising:

a vapor system bypass valve positioned such that said vapor system bypass valve is operable to selectively bypass said vapor system during low vapor operation.

27. The aircraft according to claim 24, further comprising:

a second turbine operably coupled to said second compressor.

28. The aircraft according to claim 24 wherein said conditioned air recovery system comprises:

a recovery turbine operably coupled to said first compressor, said recovery turbine being operable to direct said conditioned air to one of said first compressor and said heat dissipating device.

29. The aircraft according to claim 24, further comprising:

a ram air fan rotatably coupled to said first compressor, said ram air fan operable to supply a ram air to at least one of said first compressor and heat dissipating device.

* * * * *